United States Patent [19]

Fukuzumi et al.

[11] Patent Number: 5,407,752

[45] Date of Patent: Apr. 18, 1995

[54] POLYESTER RESIN

[75] Inventors: Tatsushi Fukuzumi, Toyohashi; Noriyuki Tajiri, Toyohashi; Miki Murata, Toyohashi; Yasunori Terashima, Toyohashi; Tomohiko Yoshida, Toyohashi, all of Japan

[73] Assignee: Mitsubishi Rayon Company Ltd., Tokyo, Japan

[21] Appl. No.: 119,816

[22] Filed: Sep. 13, 1993

Related U.S. Application Data

[63] Continuation-in-part of Ser. No. 936,651, Aug. 28, 1992, abandoned.

[30] Foreign Application Priority Data

| Aug. 28, 1991 | [JP] | Japan | 3-217231 |
| Aug. 28, 1991 | [JP] | Japan | 3-217232 |
| Jan. 14, 1992 | [JP] | Japan | 4-004907 |
| Mar. 11, 1992 | [JP] | Japan | 4-052904 |
| Apr. 30, 1992 | [JP] | Japan | 4-110963 |
| Apr. 30, 1992 | [JP] | Japan | 4-110964 |
| Apr. 30, 1992 | [JP] | Japan | 4-110965 |
| Apr. 30, 1992 | [JP] | Japan | 4-110966 |
| Apr. 30, 1992 | [JP] | Japan | 4-110967 |
| May 7, 1992 | [JP] | Japan | 4-114890 |

[51] Int. Cl.$^6$ .............................................. C08G 63/00
[52] U.S. Cl. ................................. 428/480; 525/444; 528/176; 528/193; 528/194
[58] Field of Search ..................... 528/176, 194, 194; 525/444; 428/480

[56] References Cited

FOREIGN PATENT DOCUMENTS 63-168329  7/1988  Japan .
1-136721  3/1989  Japan .

*Primary Examiner*—John Kight, III
*Assistant Examiner*—Terressa Mosley
*Attorney, Agent, or Firm*—Oblon, Spivak, McClelland, Maier & Neustadt

[57] ABSTRACT

A polyester resin comprising units of a dicarboxylic acid component composed mainly of an aromatic dicarboxylic acid or its ester forming derivative and a diol component composed mainly of ethylene glycol and an ethylene oxide adduct of a bisphenol compound or its derivative.

The resin may advantageously be used as a molding material for various moldings such as extrusion molding, blow molding, vacuum molding and injection molding.

34 Claims, No Drawings

POLYESTER RESIN

This application is a Continuation-in-Part of application Ser. No. 07/936,651, filed on Aug. 28, 1992, now abandoned.

BACKGROUND OF THE INVENTION

1. Field of the Invention

The present invention relates to a polyester resin for use as a molding material for various moldings such as extrusion molding, blow molding, vacuum molding and injection molding, and particularly to a polyester resin suitable for use as a heat shrinkable polyester film for various packaging materials etc. and a bottle for direct blow molding. More particularly, the present invention is concerned with a polyester resin that can be used as a molding material, such as a bottle for direct blow molding, capable of improving crystallinity and, at the same time, moldability and oxidation stability without detriment to mechanical properties of polyethylene terephthalate and can also be used as a highly shrinkable polyester film having high shrinkage in a relatively low temperature region and excellent heat shrinking properties, such as less liability to uneven shrinkage.

2. Description of the Related Art

A heat shrinkable plastic film has been used for display, protection, binding, improvement in the added value of goods, etc. in the fields of containers, fishing rods, capacitors, rod-shaped fluorescent lamps, etc. and also for multipack and contact packaging for books, notebooks, etc. At the present time, the development of various applications utilizing the shrinkability and shrinkage stress of the heat shrinkable film is anticipated in many fields other than those described above.

Resins such as polyvinyl chloride, polystyrene and polyolefin have hitherto been used as a material for a heat shrinkable plastic film. These resins, however, have had problems with heat resistance, weather resistance, chemical resistance, etc. For example, a polyvinyl chloride film is a heat shrinkable film having various shrinking properties. This film, however, is liable to experience the frequent occurrence of fish eye, and goods, wherein the above film subjected to printing is used as a packing material, have a spoiled appearance and a lower value. In order to obtain a heat shrinkable film free from fish eye, it is necessary to conduct excessive quality control, so problems occur such as a significant increase in the production cost of a film. The polyvinyl chloride is disadvantageous also in that incineration at the time of disposal results in a pollution problem, additives such as a plasticizer in polyvinyl chloride bleed out with the elapse of time to cause staining due to deposition of dust etc. and they are unsafe.

In the heat shrinkable film prepared from polystyrene, although finishing after shrinking is good, the solvent resistance is so low that a special ink should be used for printing. Further, since spontaneous shrinkage occurs even at room temperature, the film should be stored in a cold place. Further, it also had a problem with disposal. Specifically, since incineration at a high temperature is necessary, large amounts of black smoke and an offensive smell are unfavorably generated at the time of the incineration.

A polyester film is greatly expected as a material capable of solving the above-described problems, and the amount of use thereof has increased. In the conventional heat shrinkable polyester film, use was made of a copolymer polyester resin comprising a dicarboxylic acid moiety composed mainly of terephthalic acid and a diol moiety composed mainly of ethylene glycol and, copolymerized with the dicarboxylic acid moiety, isophthalic acid, sebacic acid, adipic acid or neopentyl glycol. The conventional heat shrinkable polyester film, however, had no satisfactory heat shrinking properties. In particular, uneven shrinkage is liable to occur during shrinkage. For this reason, when the film covers a container, such as a bottle, and then shrunk, there occurs a problem in that letters or patterns printed on the film are distorted and the adhesion of the film to the container is unsatisfactory.

Further, compared with the polystyrene film, the polyester film is inferior regarding shrinkability at a low temperature and therefore should be shrunk at a high temperature in order to attain the necessary degree of shrinkage, which gives rise to such problems as deformation and bottle whitening etc. In particular, when the polyester film is used as a label for a polyethylene bottle, since the polyethylene bottle, as such, is inferior to a PET bottle etc. in heat resistance, the shrinking operation should be conducted at the relatively low temperature of about 70° C. For this reason, the development of a heat shrinkable film having excellent shrinking properties at a low temperature has been desired in the art.

As described in Japanese Unexamined Patent Publication (Kokai) Nos. 63-168329 and 1-136721, a heat shrinkable film comprising a copolymer polyester has been developed wherein an ethylene oxide adduct of a bisphenol compound or an ethylene oxide adduct of a bisphenol derivative is used as a comonomer component and the retention time of residual stress at the time of the heat treatment is prolonged so as to improve the shrinking properties. Even in the heat shrinkable polyester film comprising the above-described copolymer polymer, alleviation in uneven shrinkage is unsatisfactory, and a high percent of shrinkage cannot be attained at a low temperature of about 70° C.

Polyethylene terephthalate, polybutylene terephthalate, etc. have generally been used as a polyester resin for a molding material used in direct blow molding or the like. Further, modified polyester resins comprising said resins copolymerized with various monomers, such as isophthalic acid or cyclohexanedimethanol, polyethylene naphthalate comprising an acid moiety composed mainly of naphthalenedicarboxylic acid, etc. have been developed.

In the modified polyester resins copolymerized with isophthalic acid, however, the mechanical strength properties, such as impact strength, deteriorate with an increase in the amount of isophthalic acid. Further, when direct blow molding is conducted, and since the melt viscosity of the resin is so low that it is very difficult to conduct molding, a comparison cannot be formed, and in particular, a large container cannot be molded. The modified polyester resin copolymerized with cyclohexanedimethanol is unsatisfactory although an improvement in moldability can be attained over that of a resin copolymerized with isophthalic acid. Further, the heat stability of the resin is so poor that when the resin stays within a molding machine for a long period of time, the deterioration of the resin is significant. Polyethylene naphthalate has the feature that it has a higher melting point than the conventional polyester resins, but, it is unsatisfactory as a resin for a molding material with respect to mechanical properties and moldability.

Further, in the polyester resin wherein ethylene glycol is used as a diol moiety, diethylene glycol produced as a by-product is contained in the resin, which leads to a lowering in the moldability and oxidation stability of the resin. An attempt to reduce the diethylene glycol content has been made by the addition of sodium hydroxide or the like during polymerization. Even a polyester resin produced by this method is unsatisfactory with respect to the moldability or oxidation stability although it is possible to reduce the diethylene glycol content to about 1.5% by weight.

SUMMARY OF THE INVENTION

The present invention provides first a polyester resin comprising units of a dicarboxylic acid component composed mainly of an aromatic dicarboxylic acid or its ester forming derivative and a diol component composed mainly of ethylene glycol and an ethylene oxide adduct of a bisphenol compound or its derivative; the content of the ethylene oxide adduct of a bisphenol compound or its derivative being 0.1 to 50% by mole based on the whole diol component, and said resin further comprising 0.1 to 20% by weight of units of polyoxytetramethylene glycol and/or polyethylene glycol.

The invention also provides a polyester resin comprising units of a dicarboxylic and component composed mainly of an aromatic dicarboxylic acid or its ester forming derivative and a diol component composed mainly of ethylene glycol and an ethylene oxide adduct of a bisphenol compound or its derivative; the content of the ethylene oxide adduct of a bisphenol compound or its derivative being 0.1 to 50% by mole based on the whole diol component, and said resin further comprising units of a tricarboxylic or higher polycarboxylic acid and/or a trihydric or higher polyhydric alcohol.

The invention also provides a polyester resin comprising units of an acid component composed mainly of terephthalic acid or its ester forming derivative and a diol component composed mainly of ethylene glycol and an ethylene oxide adduct of bisphenol A; the content of the ethylene oxide adduct of bisphenol A being 3 to 98% by mole based on the whole diol component, and said polyester resin having an intrinsic viscosity of 0.5 to 1.4 dl/g and a diethylene glycol unit content of 1.2% by weight or less.

DESCRIPTION OF THE PREFERRED EMBODIMENTS

The polyester resin of the present invention comprises units of a dicarboxylic acid component composed mainly of an aromatic dicarboxylic acid or its ester forming derivative and a diol component composed mainly of ethylene glycol and an ethylene oxide adduct of a bisphenol compound or its derivative.

At the outset, the polyester resins according to the first and second inventions will now be described. Examples of the aromatic dicarboxylic acid as a main component of the dicarboxylic acid component constituting the polyester resins according to the first and second inventions include terephthalic acid, isophthalic acid and naphthalene-1,4- and naphthalene-2,6-dicarboxylic acids. Examples of the ester forming derivatives thereof include derivatives such as dialkyl esters and diaryl esters. The content of these aromatic dicarboxylic acids or their ester forming derivatives in the dicarboxylic acid component is preferably 80% by mole or more, still preferably 85% by mole or more, and when the content of the aromatic dicarboxylic acid or its ester forming derivative is less than 80% by mole, there is a tendency, when it is formed into, for example, a film, to lower the mechanical strength of the polyester film.

The dicarboxylic acid component preferably includes terephthalic acid and isophthalic acid or their ester forming derivative. In this case, the content of the isophthalic acid or its ester forming derivative based on the whole dicarboxylic acid component is in the range of from 7 to 30% by mole, preferably in the range of from 10 to 30% by mole, still preferably in the range of from 12 to 30% by mole, because when the polyester resin is used as a heat shrinkable label for a container such as a bottle, the heat shrinkable film is used after the ends of the film are solvent-bonded to each other with a solvent, such as tetrahydrofuran, so as render the film in tubular form. Therefore, when the ends are not sufficiently bonded to each other, the label is unfavorably peeled off. The content of isophthalic acid or its ester forming derivative was limited to the above-described range for the purpose of imparting a sufficient solvent-bonding property to the film, and when the content is less than 7% by mole, no sufficient improvement in the solvent-bonding property can be attained. On the other hand, when the content exceeds 30% by mole, shrinking properties, such as uneven and high percentage shrinkage become poor.

In the polyester resin of the present invention, aliphatic dicarboxylic acids or their ester forming derivatives other than those described above may be incorporated in an amount of less than 20% by mole, preferably less than 15% by mole for the purpose of enhancing the effect of the present invention. When these aliphatic dicarboxylic acids are incorporated in an amount of 20% by mole or more, there is a possibility that when the polyester resin is formed into a film, the mechanical properties of the film are lowered. Examples of the aliphatic dicarboxylic acid useable in the present invention include glutaric acid, adipic acid, sebacic acid, azelaic acid, oxalic acid and succinic acid, and when the polyester resin is used as a heat shrinkable film, the incorporation of these aliphatic dicarboxylic acids or their ester forming derivatives in a suitable amount contributes to the enhancement of the percentage heat shrinkage.

The diol component constituting the polyester resin according to the first and second inventions should be composed mainly of ethylene glycol and an ethylene oxide adduct of a bisphenol compound or its derivative, and the content of the ethylene oxide adduct of the bisphenol compound or its derivative should be in the range of from 0.1 to 50% by mole, preferably in the range of from 0.5 to 30% by mole based on the whole diol component, because when the polyester resin is used as a heat shrinkable film, if the content of the ethylene oxide adduct of bisphenol A is less than 0.1% by mole, no effect of reducing the uneven shrinkage can be attained, while if the content exceeds 50% by mole, shrinkage at a low temperature is lowered. Examples of the ethylene oxide adduct of the bisphenol compound or its derivative include those having structures represented by the following general formulae (1) and (2).

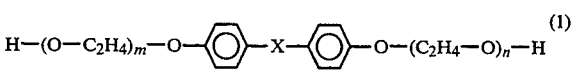

wherein X stands for $CH_2$, $C(CH_3)_2$, $C(CF_3)_2$, O, S or $SO_2$ and n and m are each a number satisfying a requirement represented by the formula $2 \leq n+m \leq 6$.

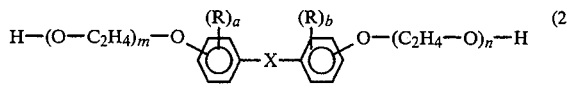

wherein X stands for $CH_2$, $C(CH_3)_2$, $C(CF_3)_2$, O, S or $SO_2$, R stands for a $C_1$-$C_5$ alkyl group or a halogen group, n and m are each a number satisfying a requirement represented by the formula $2 \leq n+m \leq 6$ and a and b are each an integer of 1 to 4.

Among others, an ethylene oxide adduct of bisphenol A having a structure represented by the following general formula (3) is preferred.

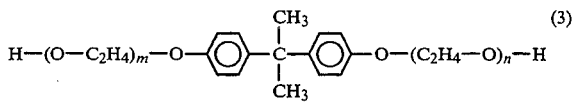

wherein n and m are each a number satisfying a requirement represented by the formula $2 \leq n+m \leq 6$.

In the present invention, the polyester resin contains, as the diol component units, units of polyoxytetramethylene glycol and/or polyethylene glycol together with ethylene glycol and the ethylene oxide adduct of a bisphenol compound or its derivative. The incorporation of polyoxytetramethylene glycol or polyethylene glycol gives rise to the reduction in uneven shrinkage when the polyester resin is used as a heat shrinkable film. The content of the polyoxytetramethylene glycol or polyethylene glycol units in the resin is preferably in the range of from 0.1 to 20% by weight, and still preferably in the range of from 0.3 to 15% by weight, because when the polyester resin is used as a heat shrinkable film, if the content of the polyoxytetramethylene glycol or polyethylene glycol is less than 0.1% by weight, the effect of reducing uneven shrinkage is small, while when the content exceeds 20% by weight, the melting point or glass transition point of the resin becomes so low that the film forming properties are lowered.

The number average molecular weight of the polyoxytetramethylene glycol used is preferably in the range of from 300 to 4,000, and the number average molecular weight of the polyethylene glycol is preferably in the range of from 300 to 20,000, and when the number average molecular weight is less than the above-described range, no reduction in the uneven shrinkage is attained, while when the number average molecular weight exceeds the above-described range, compatibility with the resin becomes unfavorably poor.

Further, according to the present invention, propylene glycol, triethylene glycol, butylene glycol, diethylene glycol, neopentyl glycol, cyclohexanedimethanol, etc. may also be used as the diol component in such an amount as will not be detrimental to the effect of the present invention.

The polyester resins according to the first and second inventions preferably contains units of a tricarboxylic or higher polycarboxylic acid, a trihydric or higher polyhydric alcohol or both. The content of these polycarboxylic acid and/or polyhydric alcohol units is preferably in the range of from 0.01 to 1% by weight, and still preferably in the range of from 0.05 to 0.7% by weight, because when the polyester resin is used as a heat shrinkable film, if the content of the tricarboxylic or higher polycarboxylic acid and/or trihydric or higher polyhydric alcohol units is less than 0.01% by weight, the effect of reducing uneven shrinkage is small, while if the content exceeds 1% by weight, gelation occurs during polymerization to form a polyester.

Examples of the polycarboxylic acid used in the present invention include trimellitic acid and pyromellitic acid and their anhydrides. Examples of the polyhydric alcohol include trimethylolpropane, glycerin and pentaerythritol. Among them, trimellitic acid, trimethylolpropane and pentaerythritol are particularly preferred from the viewpoint of film forming properties, heat stability, etc.

The polyester resin according to the third invention will now be described. In the polyester resin according to the third invention, the content of the terephthalic acid or its ester forming derivative used as the acid component is preferably 80% by mole or more, and still preferably 90% by mole or more, based on the whole acid component. In the present invention, for example, isophthalic acid, naphthalene-1,4- or naphthalene-2,6-dicarboxylic acid, glutaric acid, adipic acid, sebacic acid, oxalic acid, succinic acid and azelaic acid or their ester forming derivatives may be copolymerized as the acid component in an amount that will not be detrimental to the effect of the present invention. Examples of the ester forming derivative of terephthalic acid or other acids include dialkyl esters and diaryl esters.

The content of ethylene glycol used as the acid component is in the range of from 2 to 97% by mole, preferably in the range of from 20 to 95% by mole, and still preferably in the range of from 40 to 90% by mole, based on the whole diol component. When the ethylene glycol content is less than 2% by mole, the mechanical properties of the resultant polyester resin are inferior to those of a homopolyester resin, while when the ethylene glycol content exceeds 97% by mole, the effect of improving the crystallinity becomes unsatisfactory, and when the polyester resin is used as a material for direct blow molding, the ethylene glycol content is preferably in the range of from 50 to 90% by mole based on the whole diol component, and when the ethylene glycol content exceeds 90% by mole, the moldability in the direct blow molding is poor and mechanical strength and heat resistance are lowered, while when the ethylene glycol content is less than 50% by mole, the mechanical properties of the homopolyester resin are spoiled.

The polyester resin of the present invention should contain, as the diol component, an ethylene oxide adduct of bisphenol A represented by the general formula (3). The number of moles of added ethylene oxide is preferably in the range of from 2.0 to 2.5. The content of the ethylene oxide adduct of bisphenol A copolymerized in the resin is in the range of from 3 to 98% by mole, preferably in the range of from 5 to 80% by mole, and still preferably in the range of from 10 to 60% by mole, based on the whole diol moiety, and when the amount of copolymerization of the ethylene oxide adduct of bisphenol A is less than 3% by mole, no improvement in crystallinity can be attained, while when the amount exceeds 98% by mole, the mechanical properties of the resultant polyester resin become inferior to those of the homopolyester resin and, at the same time, the reactivity is also lowered. When the polyester resin is used as direct blow molding, the content of the ethylene oxide adduct of bisphenol A is preferably in the range of from 10 to 50% by mole based on the whole diol component, and when the content of the ethylene oxide adduct of bisphenol A is less than 10% by mole, the moldability in the direct blow molding becomes poor and, at the same time, mechanical strength and heat resistance are lowered. On the other hand, when the content of the ethylene oxide of bisphenol A exceeds 50% by mole, the mechanical properties of the homopolyester resin are lowered, which spoils favorable properties in a molded article. The content is particularly preferable in the range of from 10 to 40% by mole from the viewpoint of impact resistance.

Further, it is also possible to copolymerize neopentyl glycol, propylene glycol, polyoxytetramethylene glycol, polyethylene glycol, cyclohexanedimethanol, etc. in an amount that will not be detrimental to the effect of the present invention. However, the content of the ethylene glycol and ethylene oxide adduct of bisphenol A is preferably 80% by mole or more, and still preferably 90% by mole or more, based on the whole diol component.

The polyester resin according to the third invention should have an intrinsic viscosity of 0.5 to 1.4 dl/g as measured at 25° C. by means of a Ubbelohde viscometer in the form of a solution thereof in a mixed solvent comprising phenol and 1,1,2,2,-tetrachloroethane in a weight ratio of 1:1. The intrinsic viscosity is preferably in the range of from 0.6 to 1.2 dl/g, and when the intrinsic viscosity is less than 0.5 dl/g, strength thereof after molding becomes low, while when the intrinsic viscosity exceeds 1.4 dl/g, the fluidity becomes so poor that moldability is lowered.

It is important that the diethylene glycol unit content of the polyester resin be 1.2% by weight or less. When the diethylene glycol unit content exceeds 1.2% by weight, the moldability of the resin is lowered and also the oxidation stability, mechanical strength and heat resistance are lowered. The diethylene glycol unit content is preferably 0.9% by weight or less, and still preferably 0.8% by weight or less.

The above-described polyester resins according to the first to third inventions are produced by a known polymerization method such as transesterification or direct polymerization. In the transesterification method, the resin of the present invention can be produced by charging a reaction vessel with an ester forming derivative of a dicarboxylic acid, such as terephthalic acid, an ethylene oxide adduct of a bisphenol compound or its derivative and ethylene glycol so that the amount of the whole diol component is 1.8 to 2.5 times, by mole, that of the whole acid component, allowing a transesterification reaction to sufficiently proceed at 150° to 250° C. in the presence of a transesterification catalyst, adding a stabilizer, a polymerization catalyst, etc. to the reaction system, heating the system to 260° to 300° C. under a reduced pressure of 5 mmHg or less and allowing a reaction to proceed for 3 to 5 hr.

In the direct polymerization method, the resin of the present invention can be produced by charging a reaction vessel with terephthalic acid, an ethylene oxide adduct of bisphenol A and ethylene glycol so that the amount of the whole diol component is 1.2 to 1.8 times, by mole, that of the whole acid component, heating the mixture to 150° to 260° C. with the system being pressurized by nitrogen to allow the esterification to sufficiently proceed, heating the system to 260° to 300° C. under a reduced pressure of 5 mmHg or less and allowing a reaction to proceed for 3 to 5 hr.

Examples of the transesterification catalyst used in the production of the polyester resin according to the present invention include zinc acetate, manganese acetate, magnesium acetate and titanium tetrabutoxide. Examples of the polymerization catalyst include antimony trioxide, titanium tetrabutoxide, dibutyltin oxide and germanium dioxide, and are added in amounts of 50 to 1000 ppm based on the acid component.

The polyester resin of the present invention can be used as a material for various moldings such as extrusion molding, blow molding, vacuum molding and injection molding and are suitable particularly for use as a heat shrinkable polyester film and a polyester bottle for direct blow molding. In order to impart a particular performance to these moldings, it is also possible to conduct various known treatments or incorporate suitable additives. Examples of the treatment include irradiation with ultraviolet rays, α rays, β rays, γ rays or an electron beam, treatments such as a corona treatment, a plasma irradiation treatment and a flame treatment, coating of a resin such as vinylidene chloride, polyvinyl alcohol, polyamide or a polyolefin, a laminate and vapor deposition of a metal. Examples of the additive include resins such as polyamides, polyolefins, polymethyl methacrylate and polycarbonate, inorganic particles such as silica, talc, kaolin and calcium carbonate, pigments such as titanium oxide and carbon black, dyes, ultraviolet absorbers, release agents, flame retardants, antioxidants and heat stabilizers.

Use of the polyester resin of the present invention as a heat shrinkable polyester film will now be described.

In the case of the heat shrinkable polyester film, a raw film is formed from the polyester resin of the present invention, preferably the polyester resin according to the first or second invention by a known film forming method, such as a casting roller method or a calender method. The raw film is then stretched 1.5 to 5.0 times the original length in the longitudinal direction or the lateral direction, preferably 1.5 to 4.8 times the original length at a temperature of at least 3° C. and preferably at least 5° C. above the glass transition temperature of the polyester resin to impart a high percentage shrinkage to the film. If necessary, the film is further stretched in a direction normal to the above stretching direction 1.0 to 1.8 times, preferably 1.0 to 1.5 times the original length, which is useful for preventing the film from unnecessarily and excessively shrinking in the above stretching direction through enhancement of the tensile strength of the film. The drawing of the film is conducted by simultaneous biaxial stretching, successive biaxial stretching, uniaxial stretching, etc.

The stretched heat shrinkable polyester film, as such, can be used as a product. Alternatively, it may be heat-treated at a temperature of 50° to 150° C. for several seconds to several tens of seconds to attain dimensional stability. The heat treatment can lead to the development of favorable properties such as the adjustment of percentage shrinkage of the polyester film in the direction of shrinkage, reduction in the shrinkage with the elapse of time during storage of an unshrunk film or reduction in the occurrence of a shrink spot, and although the film thickness is not particularly limited, it is usually in the range of from 1 to 600 μm from a practical viewpoint. In packaging applications, particularly, in packaging foods, beverages, medicines, etc., use is made of a film having a thickness in the range of from 6 to 380

μm. In the case of use as a label for PET bottles, glass bottles, etc., use is made of a film having a thickness in the range of from 20 to 70 μm.

The percentage shrinkage of the heat shrinkable polyester film of the present invention prepared by the above method is preferably 20% or more at 60° C. in a unidirection (in the direction of shrinkage) when the film is heated in a hot bath for 60 sec. When the percentage shrinkage at 60° C. is less than 20%, adhesion to a container is unsatisfactory, so that it becomes necessary to increase the heating temperature during the shrinking step. An increase in the heating temperature in the shrinking step gives rise to deformation or a whitening of the container, such as a bottle, and the rapid shrinkage of a heat shrinkable film, which is causative of the occurrence of uneven shrinkage. Shrinkage at 60° C. is preferably 25% or more, and still preferably 30% or more.

The shrinking initiation temperature of the heat shrinkable polyester film should be 50° C. or below for attaining excellent shrinking properties, because when the heat shrinkable polyester film exhibits a percentage shrinkage of 20% or more at 60° C. and a shrinking initiation temperature exceeding 50° C., rapid shrinkage occurs at the time of film shrinkage, which leads to uneven shrinkage. The shrinkage at 50° C. is preferably at least 1%, and still preferably 2% or more.

Further, it is preferred that when the heat shrinkable polyester film is immersed, for example, in a hot bath of 60° C., the average shrinking rate be in the range of from 0.3 to 3%/sec in a period of each 10 sec between 0 sec and 10 sec, between 10 sec and 20 sec and between 20 sec and 30 sec after immersion. Specifically, the heat shrinkable polyester film exhibits shrinkage properties such that, when it is immersed in a hot bath, moderate shrinkage behavior occurs and shrinkage occurs evenly 30 sec after immersion, because when the average shrinkage rate of the film in hot water is less than 0.3%/sec, and since sufficient shrinkage does not occur, the adhesion of the film to a container is unsatisfactory, so that it is necessary to increase the heating temperature during the shrinking step. An increase in the heating temperature during the shrinking step gives rise to deformation or whitening of a container such as a bottle and, at the same time, gives rise to rapid shrinkage of a heat shrinkable film, which is causative of the occurrence of uneven shrinkage. On the other hand, when the average shrinkage rate of the film in hot water exceeds 3%/sec, the shrinkage of the film becomes rapid, so that uneven shrinkage occurs.

In the heat shrinkable polyester film of the present invention, the average shrinkage rate in hot water is in the range of 0.3 to 3%/sec in a period of each 10 sec between 0 sec and 10 sec, between 10 sec and 20 sec and between 20 sec and 30 sec after immersion, and the relationship between the immersion time (sec) and the shrinkage (%) is such that the shrinkage increases at a relatively constant rate with the elapse of immersion time and the percentage of increase is relatively moderate. This indicates that when shrinkage for 30 sec after immersion is even, it becomes possible to prevent uneven shrinkage attributable to rapid shrinkage and when moderate shrinkage is maintained for a relatively long period of time, no uneven shrinkage occurs, so that adhesion of the film to a container or the like becomes satisfactory.

EXAMPLES

The present invention will be further illustrated with reference to the following non-limitative Examples.

In the Examples, the percentage of shrinkage was determined by providing marked lines at intervals of 100 mm on a polyester film cut out into 150 mm segments in the direction of stretching and 20 mm in a direction normal to the direction of stretching, heating the polyester film in air at 80° C. and 100° C. (Examples 1 to 9 and Comparative Examples 1 to 8) or hot water at 50° to 90° C. (Examples 10 to 19 and Comparative Examples 9 to 15) without a load for 60 sec, measuring the length before shrinkage (L) and the length after shrinkage (L') in the direction of film shrinkage and determining the percentage shrinkage according to the following equation.

$$\text{Shrinkage } (\%) = \{(L-L')/L\} \times 100$$

With respect to uneven shrinkage, a polyester film cut so as to be 150 mm in the direction of stretching and 20 mm in a direction normal to the direction of stretching was heat-shrunk in water at 90° C. without application of a load for 60 sec, and the occurrence of uneven shrinkage of the film was evaluated according to the following criteria.

⊙: No uneven shrinkage was observed.
○: Substantially no uneven shrinkage was observed.
Δ: Some uneven shrinkage was observed.
x: Remarkable uneven shrinkage was observed.

The solvent-bondability was evaluated by putting both ends of the polyester film on top of the other, bonding the ends to each other by using tetrahydrofuran as an organic solvent, allowing the polyester film to stand for 24 hr, pulling the bonded surface by hand and evaluating the bonding strength according to the following criteria.

⊙: Bonding strength was excellent.
○: Sufficient bonding strength was obtained.
Δ: Bonding strength was relatively small.
x: Bonding strength was unsatisfactory or no bonding was attained.

The intrinsic viscosity was measured at 25° C. by means of a Ubbelohde viscometer in the form of a solution of the polyester resin dissolved in a mixed solvent comprising phenol and 1,1,2,2-tetrachloroethane in a weight ratio of 1:1.

The glass transition temperature (Tg), melting point (Tm), crystallization peak temperature from a glassy state (Tc+) and crystallization exothermic peak temperature (Tc−) from a molten state were determined after raising the temperature of a melt-quenched sample in a nitrogen stream at 280° C. at a temperature rise rate of 5° C./min to 280° C. in a differential scanning calorimeter (DT-40 manufactured by Shimadzu Seisakusho Ltd.). The shoulder value was adopted in the Tg, and the peak value was adopted in the Tm, Tc+ and Tc− values.

The impact strength was evaluated in a notch state (impact strength 1) and an unnotched state (impact strength 2) on a specimen of No. 1-A prepared according to a method specified in Izod impact strength (JIS K7110).

The diethylene glycol content of the resin was measured by decomposing the resin with hydrazine and filtering the decomposition solution and subjecting the filtrate to gas chromatography.

The moldability was evaluated by setting the resin temperature to 210° C. for a non-crystalline resin and 240° C. for a crystalline resin, extruding a parison having a length of 200 mm, subjecting the parison to direct blow molding and evaluating 10 molded articles according to the following criteria.

⊚: All the 10 molded articles were acceptable.
○: 9 out of the 10 molded articles were acceptable.
Δ: 7 out of the 10 molded articles were acceptable.
x: 6 out of the 10 molded articles were acceptable.

The oxidation stability was evaluated by subjecting a resin having a water content regulated to 100 ppm or less to extrusion at a resin temperature of 250° C. by means of a conventional uniaxial extruder provided with no vent, measuring a change in the IV value between before and after the extrusion and evaluating the oxidation stability in terms of the lowering in the IV value according to the following criteria.

A: The lowering in the IV value was less than 5%.
B: The lowering in the IV value was 5% to 10% exclusive.
C: The lowering in the IV value was 10% or more.

In the following Examples, an ethylene oxide adduct of bisphenol A represented by the general formula (3) or an ethylene oxide adduct of bisphenol S represented by the general formula (1) wherein n+m=2 was used as the ethylene oxide adduct of the bisphenol compound or its derivative.

EXAMPLE 1

A reaction vessel was charged with 100 parts by mole of terephthalic acid, 2 parts by mole of an ethylene oxide adduct of bisphenol A, 147 parts by mole of ethylene glycol and 10% by weight, based on the polymer, of polyoxytetramethylene glycol (number average molecular weight: 1000). Antimony trioxide was added thereto as a polymerization catalyst in an amount of 450 ppm based on the whole acid component, and polymerization was conducted by direct polymerization.

The resultant polyester resin was melt-extruded at 270° C. to prepare a raw film. The raw film was uniaxially stretched at 65° C. by 3.8 times the original length in the direction of stretching (direction of TD) to give a heat shrinkable polyester film having a thickness of 35 μm. The results of measurement of the percentage shrinkage and the results of evaluation of uneven shrinkage of the resultant film are given in Table 1.

EXAMPLE 2

A reaction vessel was charged with 100 parts by mole of dimethyl terephthalate, 30 parts by mole of an ethylene oxide adduct of bisphenol A, 148 parts by mole of ethylene glycol and 20% by weight, based on the polymer, of polyethylene glycol (number average molecular weight: 10000). Zinc acetate was added thereto as a transesterification catalyst in an amount of 350 ppm based on the whole acid component, germaniumdioxide was added thereto as a polymerization catalyst in an amount of 450 ppm based on the whole acid component, trimethyl phosphate was added thereto as a stabilizer in an amount of 350 ppm based on the whole acid component, and polymerization was conducted by transesterification.

The resultant polyester resin was melt-extruded at 270° C. to prepare a raw film. The raw film was uniaxially stretched at 60° C. 3.8 times the original length in the direction of stretching (direction of TD) to give a heat shrinkable polyester film having a thickness of 35 μm. The results of the measurement of the percentage shrinkage and the results of the evaluation of uneven shrinkage of the resultant film are given in Table 1.

EXAMPLE 3

A reaction vessel was charged with 90 parts by mole of terephthalic acid, 10 parts by mole of isophthalic acid, 0.3 part by mole of an ethylene oxide adduct of bisphenol A, 141 parts by mole of ethylene glycol and 0.1% by weight, based on the polymer, of polyoxytetramethylene glycol (number average molecular weight: 650), and polymerization and stretching were conducted in the same manner as that of Example 1 to give a heat shrinkable polyester film having a thickness of 40 μm. The results of the measurement of the percentage shrinkage and the results of the evaluation of uneven shrinkage of the resultant film are provided in Table 1.

EXAMPLE 4

A reaction vessel was charged with 83 parts by mole of terephthalic acid, 17 parts by mole of isophthalic acid, 45 parts by mole of an ethylene oxide adduct of bisphenol A, 100 parts by mole of ethylene glycol and 12% by weight, based on the polymer, of polyethylene glycol (number average molecular weight: 300). Germanium dioxide was added thereto as a polymerization catalyst in an amount of 450 ppm based on the whole acid component, and polymerization was conducted by direct polymerization.

A heat shrinkable polyester film having a thickness of 40 μm was prepared from the resultant polyester resin in the same manner as that of Example 1. The results of the measurement of the percentage shrinkage and the results of the evaluation of uneven shrinkage of the resultant film are provided in Table 1.

EXAMPLE 5

A reaction vessel was charged with 90 parts by mole of terephthalic acid, 10 parts by mole of isophthalic acid, 10 parts by mole of an ethylene oxide adduct of bisphenol S, 150 parts by mole of ethylene glycol and 5% by weight, based on the polymer, of polyethylene glycol (number average molecular weight: 300). Trimethyl phosphate was added thereto as a stabilizer in an amount of 50 ppm based on the whole acid moiety, germanium dioxide was added thereto as a polymerization catalyst in an amount of 450 ppm based on the whole acid component, and polymerization was conducted by direct polymerization.

The resultant polyester resin was melt-extruded at 270° C. to prepare a raw film. The raw film was uniaxially stretched at 70° C. 3.8 times the original length in the direction of stretching (direction of TD) to give a heat shrinkable polyester film having a thickness of 40 μm. The results of the measurement of the percentage shrinkage and the results of the evaluation of uneven shrinkage of the resultant film are provided in Table 1.

EXAMPLE 6

A reaction vessel was charged with 100 parts by mole of terephthalic acid, 2 parts by mole of an ethylene oxide adduct of bisphenol A, 147 parts by mole of ethylene glycol, 0.01% by weight, based on the polymer, of trimethylolpropane and 10% by weight, based on the polymer, of polyoxytetramethylene glycol (number average molecular weight: 1000). Antimony trioxide was added thereto as a polymerization catalyst in an amount of 450 ppm based on the whole acid component, and polymerization was conducted by direct polymerization.

The resultant polyester resin was melt-extruded at 270° C. to prepare a raw film. The raw film was uniaxially stretched at 65° C. by 3.8 times the original length in the direction of stretching (direction of TD) to provide a heat shrinkable polyester film having a thickness of 35 μm. The results of the measurement of the percentage maximum shrinkage and the results of the evaluation of uneven shrinkage of the resultant film are provided in Table 1.

EXAMPLE 7

A reaction vessel was charged with 100 parts by mole of dimethyl terephthalate, 30 parts by mole of an ethylene oxide adduct of bisphenol A, 148 parts by mole of ethylene glycol, 0.09% by weight, based on the polymer, of trimellitic anhydride and 20% by weight, based on the polymer, of polyethylene glycol (number average molecular weight: 10000). Zinc acetate was added thereto as a transesterification catalyst in an amount of 350 ppm based on the whole acid component, germanium dioxide was added thereto as a polymerization catalyst in an amount of 450 ppm based on the whole acid component, trimethyl phosphate was added thereto as a stabilizer in an amount of 350 ppm based on the whole acid component, and polymerization was conducted by transesterification.

The resultant polyester resin was melt-extruded at 270° C. to prepare a raw film. The raw film was uniaxially stretched at 60° C. by 3.8 times the original length in the direction of stretching (direction of TD) to provide a heat shrinkable polyester film having a thickness of 35 μm. The results of the measurement of the percentage maximum shrinkage and the results of the evaluation of uneven shrinkage of the resultant film are provided in Table 1.

EXAMPLE 8

A reaction vessel was charged with 90 parts by mole of terephthalic acid, 10 parts by mole of isophthalic acid, 0.2 part by mole of an ethylene oxide adduct of bisphenol A, 141 parts by mole of ethylene glycol, 0.5% by weight, based on the polymer, of pentaerythritol and 0.1% by weight, based on the polymer, of polyoxytetramethylene glycol (number average molecular weight: 650). Polymerization and stretching were conducted in the same manner as that of Example 1 to provide a heat shrinkable polyester film having a thickness of 40 μm. The results of the measurement of the percentage maximum shrinkage and the results of the evaluation of uneven shrinkage of the resultant film are provided in Table 1.

EXAMPLE 9

A reaction vessel was charged with 83 parts by mole of terephthalic acid, 17 parts by mole of isophthalic acid, 48 parts by mole of an ethylene oxide adduct of bisphenol S, 145 parts by mole of ethylene glycol, 0.7% by weight, based on the polymer, of trimethylolpropane and 12% by weight, based on the polymer, of polyethylene glycol (number average molecular weight: 300). Germanium dioxide was added thereto as a polymerization catalyst in an amount of 450 ppm based on the whole acid component, and polymerization was conducted by direct polymerization.

A heat shrinkable polyester film having a thickness of 40 μm was prepared from the resultant polyester resin in the same manner as that of Example 1. The results of the measurement of the percentage maximum shrinkage and the results of the evaluation of uneven shrinkage of the resultant film are provided in Table 1.

COMPARATIVE EXAMPLE 1

A reaction vessel was charged with 100 parts by mole of terephthalic acid and 150 parts by mole of ethylene glycol. Germanium dioxide was added thereto as a polymerization catalyst in an amount of 450 ppm based on the whole acid component, trimethyl phosphate was added thereto as a stabilizer in an amount of 350 ppm based on the whole acid component, and polymerization was conducted by direct polymerization.

The resultant polyester resin was melt-extruded at 270° C. to prepare a raw film. The raw film was uniaxially stretched at 85° C. by 3.8 times the original length in the direction of stretching (direction of TD) to give a heat shrinkable polyester film having a thickness of 40 μm. The results of the measurement of the percentage shrinkage and the results of the evaluation of uneven shrinkage of the resultant film are provided in Table 2.

COMPARATIVE EXAMPLE 2

A reaction vessel was charged with 100 parts by mole of dimethyl terephthalate, 140 parts by mole of ethylene glycol and 70% by weight, based on the polymer, of polyethylene glycol (number average molecular weight: 1000), and polymerization was conducted in the same manner as that of Example 2. The heat resistance of the resultant polyester resin was so poor that no film could be formed.

COMPARATIVE EXAMPLE 3

A reaction vessel was charged with 100 parts by mole of terephthalic acid, 100 parts by mole of an ethylene oxide adduct of bisphenol A, 100 parts by mole of ethylene glycol and 10% by weight, based on the polymer, of polyoxytetramethylene glycol (number average molecular weight: 1000). Antimony trioxide was added thereto as a polymerization catalyst in an amount of 450 ppm based on the whole acid component, trimethyl phosphate was added thereto as a stabilizer in an amount of 350 ppm based on the whole acid component, and polymerization was conducted by direct polymerization. However, the degree of polymerization became not increased in the course of the polymerization, so that no polyester resin for forming a film could be obtained.

COMPARATIVE EXAMPLE 4

A reaction vessel was charged with 90 parts by mole of terephthalic acid, 10 parts by mole of isophthalic acid, 20 parts by mole of an ethylene oxide adduct of bisphenol A and 130 parts by mole of ethylene glycol. Trimethyl phosphate was added thereto as a stabilizer in an amount of 200 ppm based on the whole acid component, germanium dioxide was added thereto as a polymerization catalyst in an amount of 400 ppm based on the whole acid component, and polymerization was conducted by direct polymerization.

The resultant polyester resin was melt-extruded at 270° C. to prepare a raw film. The raw film was uniaxially stretched at 65° C. by 3.8 times the original length in the direction of stretching (direction of TD) to give a heat shrinkable polyester film having a thickness of 40 μm. The results of the measurement of the percentage shrinkage and the results of the evaluation of uneven shrinkage of the resultant film are provided in Table 2.

COMPARATIVE EXAMPLE 5

A reaction vessel was charged with 83 parts by mole of terephthalic acid, 17 parts by mole of isophthalic acid, 130 parts by mole of ethylene glycol and 5% by weight, based on the polymer, of polytetraoxymethylene glycol (number average molecular weight: 2000). Trimethyl phosphate was added thereto as a stabilizer in an amount of 200 ppm based on the whole acid component, germanium dioxide was added thereto as a polymerization catalyst in an amount of 400 ppm based on the whole acid component, and polymerization was conducted by direct polymerization.

The resultant polyester resin was melt-extruded at 270° C. to prepare a raw film. The raw film was uniaxially stretched at 65° C. by 3.8 times the original length in the direction of stretching (direction of TD) to give a heat shrinkable polyester film having a thickness of 40 μm. The results of the measurement of the percentage shrinkage and the results of the evaluation of uneven shrinkage of the resultant film are provided in Table 1.

COMPARATIVE EXAMPLE 6

A reaction vessel was charged with 100 parts by mole of terephthalic acid, 60 parts by mole of an ethylene oxide adduct of bisphenol A, 140 parts by mole of ethylene glycol, 0.005% by weight, based on the polymer, of trimellitic acid and 0.05% by weight, based on the polymer, of polyethylene glycol (number average molecular weight: 1000), and polymerization was conducted in the same manner as that of Example 1.

The resultant polyester resin was melt-extruded at 270° C. to prepare a raw film. The raw film was uniaxially stretched at 85° C. by 3.8 times the original length in the direction of stretching (direction of TD) to give a heat shrinkable polyester film having a thickness of 40 μm. The results of the measurement of the percentage maximum shrinkage and the results of the evaluation of uneven shrinkage of the resultant film are provided in Table 2.

COMPARATIVE EXAMPLE 7

A reaction vessel was charged with 100 parts by mole of terephthalic acid, 50 parts by mole of an ethylene oxide adduct of bisphenol A, 100 parts by mole of ethylene glycol, 10% by weight, based on the polymer, of trimethylolpropane and 10% by weight, based on the polymer, of polyoxytetramethylene glycol (number average molecular weight: 1000). Antimony trioxide was added thereto as a polymerization catalyst in an amount of 450 ppm based on the whole acid component, trimethyl phosphate was added thereto as a stabilizer in an amount of 350 ppm based on the whole acid component, and polymerization was conducted by direct polymerization. However, gelation occurred in the course of the polymerization, so that no polyester resin for forming a film could be prepared.

COMPARATIVE EXAMPLE 8

A reaction vessel was charged with 90 parts by mole of terephthalic acid, 10 parts by mole of isophthalic acid, 42 parts by mole of an ethylene oxide adduct of bisphenol A, 110 parts by mole of ethylene glycol and 10% by weight, based on the polymer, of polyoxytetramethylene glycol (number average molecular weight: 1000). Trimethyl phosphate was added thereto as a stabilizer in an amount of 300 ppm based on the whole acid content, antimony trioxide was added thereto as a polymerization catalyst in an amount of 450 ppm based on the whole acid content, and polymerization was conducted by direct polymerization.

The resultant polyester resin was melt-extruded at 270° C. to prepare a raw film. The raw film was uniaxially stretched at 85° C. by 3.8 times the original length in the direction of stretching (direction of TD) to give a heat shrinkable polyester film having a thickness of 40 μm. The results of the measurement of the percentage maximum shrinkage and the results of the evaluation of uneven shrinkage of the resultant film are provided in Table 2.

TABLE 1

| | Example No. | | | | | | | | |
|---|---|---|---|---|---|---|---|---|---|
| | 1 | 2 | 3 | 4 | 5 | 6 | 7 | 8 | 9 |
| acid component (mol %) | | | | | | | | | |
| TPA | 100 | 100 | 90 | 83 | 90 | 100 | 100 | 90 | 83 |
| IPA | — | — | 10 | 17 | 10 | — | — | 10 | 17 |
| diol component (mol %) | | | | | | | | | |
| EG | 98 | 70 | 99.7 | 55 | 90 | 98 | 70 | 99.8 | 52 |
| BPAE | 2 | 30 | 0.3 | 45 | — | 2 | 30 | 0.2 | — |
| BPSE | — | — | — | — | 10 | — | — | — | 48 |
| PEG | | | | | | | | | |
| (wt. %) | — | 20 | — | 12 | 5 | — | 20 | — | 12 |
| (MW) | | (10000) | | (300) | (300) | | (10000) | | (300) |
| PTMC | | | | | | | | | |
| (wt. %) | 10 | — | 0.1 | — | — | 10 | — | 0.1 | — |
| (MW) | (1000) | | (650) | | | (1000) | | (650) | |
| polyhydric component | | | | | | | | | |
| (wt. %) | — | — | — | — | — | 0.01 | 0.09 | 0.5 | 0.7 |
| (kind) | | | | | | (TMP) | (TMA) | (PEN) | (TMF) |
| intrinsic viscosity | 0.72 | 0.65 | 0.59 | 0.79 | 0.88 | 0.71 | 0.75 | 0.78 | 0.71 |
| shrinkage (%) | | | | | | | | | |
| 80° C. | 35.6 | 31.2 | 32.5 | 35.2 | 34.3 | 33.6 | 35.7 | 38.1 | 38.4 |
| 100° C. | 44.7 | 43.1 | 44.1 | 47.3 | 46.1 | 46.7 | 44.9 | 47.4 | 45.4 |
| uneven shrinkage | ○ | ○ | ○ | ○ | ○ | ◉ | ◉ | ◉ | ◉ |

TABLE 2

| | Comparative Example No. | | | | |
|---|---|---|---|---|---|
| | 1 | 4 | 5 | 6 | 8 |
| acid component (mol %) | | | | | |
| TPA | 100 | 90 | 83 | 100 | 90 |
| IPA | — | 10 | 17 | — | 10 |
| diol component (mol %) | | | | | |
| EG | 100 | 80 | 100 | 40 | 60 |
| BPAE | — | 20 | — | 60 | 40 |
| BPSE | — | — | — | — | — |
| PEG | | | | | |
| (wt. %) | — | — | — | 0.05 | — |
| (MW) | | | | (1000) | |
| PTMG | | | | | |
| (wt. %) | — | — | 5 | — | 7 |
| (MW) | | | (2000) | | (1000) |
| polyhydric component | | | | | |
| (wt. %) | — | — | — | 0.005 | — |
| (kind) | | | | (TMA) | |
| intrinsic viscosity | 0.88 | 0.78 | 0.75 | 0.76 | 0.78 |
| shrinkage (%) | | | | | |
| 80° C. | 35.7 | 31.1 | 33.9 | 49.5 | 33.9 |
| 100° C. | 57.9 | 49.5 | 51.5 | 58.3 | 42.5 |
| uneven shrinkage | x | Δ | Δ | Δ | Δ |

The components listed in the tables are as follows. TPA: terephthalic acid IPA: isophthalic acid EG: ethylene glycol BPAE: ethylene oxide adduct of bisphenol A BPSE: ethylene oxide adduct of bisphenol S PEG: polyethylene glycol PTMG: polyoxytetramethylene glycol TMA: trimellitic acid TMP: trimethylolpropane PEN: pentaerythritol As is apparent from Table 1, the heat shrinkable polyester films of Examples 1 to 9 according to the present invention exhibited a heat shrinkage of 30% or more at 80° C. and 40% or more at 100° C., and substantially no uneven shrinkage was observed. On the other hand, as shown in Table 2, although heat shrinkable polyester films of Comparative Examples 1, 4, 5, 6 and 8 exhibited a large shrinkage, the occurrence of uneven shrinkage was observed, so that these films are not practical.

EXAMPLE 10

A reaction vessel was charged with 95 parts by mole of terephthalic acid, 5 parts by mole of isophthalic acid, 150 parts by mole of ethylene glycol, 2 parts by mole of an ethylene oxide adduct of bisphenol A, 0.15 part by mole of trimethylolpropane and 7% by weight, based on the polymer, of polyoxytetramethylene glycol (number average molecular weight: 1000). Antimony trioxide was added thereto as a polycondensation catalyst in an amount of 450 ppm based on the whole acid component, and polymerization was conducted by direct polymerization to give a polyester resin.

The resultant polyester resin was melt-extruded at 270° C. to prepare a raw film. The raw film was uniaxially stretched at 75° C. by 3.8 times the original length in the direction of stretching (direction of TD) to give a heat shrinkable polyester film having a thickness of 40 μm.

The results of the measurement of the percentage shrinkage and shrinkage initiation temperature and the results of the evaluation of uneven shrinkage of the resultant film are given in Table 3.

EXAMPLE 11

A reaction vessel was charged with 90 parts by mole of terephthalic acid, 10 parts by mole of isophthalic acid, 140 parts by mole of ethylene glycol, 3 parts by mole of an ethylene oxide adduct of bisphenol A and 10% by weight, based on the polymer, of polyoxytetramethylene glycol (number average molecular weight: 1000). Trimethyl phosphate was added thereto as a stabilizer in an amount of 60 ppm based on the whole acid component, and germanium dioxide was added thereto as a polymerization catalyst in an amount of 250 ppm based on the whole acid component. Polymerization was conducted by direct polymerization to give a polyester resin.

The resultant polyester resin was melt-extruded at 270° C. to prepare a raw film. The raw film was uniaxially stretched at 65° C. by 3.8 times the original length in the direction of stretching (direction of TD) to give a heat shrinkable polyester film having a thickness of 40 μm. The results of the measurement of the percentage shrinkage and shrinkage initiation temperature and the results of the evaluation of uneven shrinkage of the resultant film are provided in Table 1.

EXAMPLE 12

A reaction vessel was charged with 95 parts by mole of terephthalic acid, 5 parts by mole of isophthalic acid, 140 parts by mole of ethylene glycol, 5 parts by mole of an ethylene oxide adduct of bisphenol A and 7% by weight, based on the polymer, of polyoxytetramethylene glycol (number average molecular weight: 1000). Trimethyl phosphate was added thereto as a stabilizer in an amount of 100 ppm based on the whole acid component, and antimony trioxide was added thereto as a polymerization catalyst in an amount of 450 ppm based on the whole acid component. Polymerization was conducted by direct polymerization to give a polyester resin.

The resultant polyester resin was melt-extruded at 270° C. to prepare a raw film. The raw film was uniaxially stretched at 65° C. by 3.8 times the original length in the direction of stretching (direction of TD) to give a heat shrinkable polyester film having a thickness of 40 μm. The results of the measurement of the percentage shrinkage and shrinkage initiation temperature and the results of the evaluation of uneven shrinkage of the resultant film are provided in Table 3.

EXAMPLE 13

A reaction vessel was charged with 87 parts by mole of terephthalic acid, 13 parts by mole of isophthalic acid, 140 parts by mole of ethylene glycol, 3 parts by mole of an ethylene oxide adduct of bisphenol A and 5% by weight, based on the polymer, of polyoxytetramethylene glycol (number average molecular weight: 1000). Trimethyl phosphate was added thereto as a stabilizer in an amount of 100 ppm based on the whole acid component, and antimony trioxide was added thereto as a polymerization catalyst in an amount of 450 ppm based on the whole acid component. Polymerization was conducted by direct polymerization to give a polyester resin.

The resultant polyester resin was melt-extruded at 270° C. to prepare a raw film. The raw film was uniaxially stretched at 65° C. by 3.8 times the original length in the direction of stretching (direction of TD) to give a heat shrinkable polyester film having a thickness of 40 μm. The results of the measurement of the percentage shrinkage and shrinkage initiation temperature and the results of the evaluation of uneven shrinkage of the resultant film are provided in Table 3.

EXAMPLE 14

A reaction vessel was charged with 87 parts by mole of terephthalic acid, 13 parts by mole of isophthalic acid, 140 parts by mole of ethylene glycol, 5 parts by mole of an ethylene oxide adduct of bisphenol A and 10% by weight, based on the polymer, of polyoxytetramethylene glycol (number average molecular weight: 1000). Trimethyl phosphate was added thereto as a stabilizer in an amount of 100 ppm based on the whole acid component, and antimony trioxide was added thereto as a polymerization catalyst in an amount of 450 ppm based on the whole acid component. Polymerization was conducted by direct polymerization to give a polyester resin.

The resultant polyester resin was melt-extruded at 270° C. to prepare a raw film. The raw film was uniaxially stretched at 65° C. by 3.8 times the original length in the direction of stretching (direction of TD) to give a heat shrinkable polyester film having a thickness of 40 μm. The results of the measurement of the percentage shrinkage and shrinkage initiation temperature and the results of the evaluation of uneven shrinkage of the resultant film are given in Table 3.

COMPARATIVE EXAMPLE 9

A reaction vessel was charged with 90 parts by mole of terephthalic acid, 10 parts by mole of isophthalic acid and 150 parts by mole of ethylene glycol. Antimony trioxide was added thereto as a polymerization catalyst in an amount of 450 ppm based on the whole acid component. Polymerization was conducted by direct polymerization to give a polyester resin.

A heat shrinkable polyester film having a thickness of 40 μm was prepared from the resultant polyester resin in the same manner as that of Example 1. The results of the measurement of the percentage shrinkage and shrinkage initiation temperature and the results of the evaluation of uneven shrinkage of the resultant film are provided in Table 3.

COMPARATIVE EXAMPLE 10

A reaction vessel was charged with 93 parts by mole of terephthalic acid, 7 parts by mole of isophthalic acid and 140 parts by mole of ethylene glycol. Trimethyl phosphate was added thereto as a stabilizer in an amount of 100 ppm based on the whole acid moiety, and antimony trioxide was added thereto as a polymerization catalyst in an amount of 450 ppm based on the whole acid component. Polymerization was conducted by direct polymerization to give a polyester resin.

The resultant polyester resin was melt-extruded at 270° C. to prepare a raw film. The raw film was uniaxially stretched at 80° C. by 3.8 times the original length in the direction of stretching (direction of TD) to give a heat shrinkable polyester film having a thickness of 40 μm. The results of the measurement of the percentage shrinkage and shrinkage initiation temperature and the results of the evaluation of uneven shrinkage of the resultant film are provided in Table 3.

COMPARATIVE EXAMPLE 11

A reaction vessel was charged with 100 parts by mole of terephthalic acid, 140 parts by mole of ethylene glycol and 10 parts by mole of an ethylene oxide adduct of bisphenol A. Trimethyl phosphate was added thereto as a stabilizer in an amount of 100 ppm based on the whole acid moiety, and antimony trioxide was added thereto as a polymerization catalyst in an amount of 450 ppm based on the whole acid component. Polymerization was conducted by direct polymerization to give a polyester resin.

The resultant polyester resin was melt-extruded at 270° C. to prepare a raw film. The raw film was uniaxially stretched at 80° C. by 3.8 times the original length in the direction of stretching (direction of TD) to give a heat shrinkable polyester film having a thickness of 40 μm. The results of the measurement of the percentage shrinkage and shrinkage initiation temperature and the results of the evaluation of uneven shrinkage of the resultant film are provided in Table 3.

COMPARATIVE EXAMPLE 12

A reaction vessel was charged with 95 parts by mole of terephthalic acid, 5 parts by mole of sebacic acid, 140 parts by mole of ethylene glycol and 10 parts by mole of an ethylene oxide adduct of bisphenol A. Trimethyl phosphate was added thereto as a stabilizer in an amount of 100 ppm based on the whole acid moiety, and antimony trioxide was added thereto as a polymerization catalyst in an amount of 450 ppm based on the whole acid component. Polymerization was conducted by direct polymerization to give a polyester resin.

The resultant polyester resin was melt-extruded at 270° C. to prepare a raw film. The raw film was uniaxially stretched at 80° C. by 3.8 times the original length in the direction of stretching (direction of TD) to give a heat shrinkable polyester film having a thickness of 40 μm. The results of the measurement of the percentage shrinkage and shrinkage initiation temperature and the results of the evaluation of uneven shrinkage of the resultant film are provided in Table 3.

COMPARATIVE EXAMPLE 13

A reaction vessel was charged with 90 parts by mole of terephthalic acid, 10 parts by mole of isophthalic acid, 140 parts by mole of ethylene glycol and 10 parts by mole of an ethylene oxide adduct of bisphenol A. Trimethyl phosphate was added thereto as a stabilizer in an amount of 100 ppm based on the whole acid moiety, and antimony trioxide was added thereto as a polymerization catalyst in an amount of 450 ppm based on the whole acid component. Polymerization was conducted by direct polymerization to provide a polyester resin.

The resultant polyester resin was melt-extruded at 270° C. to prepare a raw film. The raw film was uniaxially stretched at 80° C. by 3.8 times the original length in the direction of stretching (direction of TD) to give a heat shrinkable polyester film having a thickness of 40 μm. The results of the measurement of the percentage shrinkage and shrinkage initiation temperature and the results of the evaluation of uneven shrinkage of the resultant film and provided in Table 3.

TABLE 3

|  | Example No. | | | | | Comparative Example No. | | | | |
| --- | --- | --- | --- | --- | --- | --- | --- | --- | --- | --- |
|  | 10 | 11 | 12 | 13 | 14 | 9 | 10 | 11 | 12 | 13 |
| acid component (mol %) | | | | | | | | | | |
| TPA | 95 | 90 | 95 | 87 | 87 | 90 | 93 | 100 | 95 | 90 |
| IPA | 5 | 10 | 5 | 13 | 13 | 10 | 7 | — | — | 10 |
| SA | — | — | — | — | — | — | — | — | 5 | — |
| diol component (mol %) | | | | | | | | | | |
| EG | 97.85 | 96.85 | 94.85 | 96.85 | 94.85 | 100 | 100 | 90 | 90 | 90 |
| BPAE | 2 | 3 | 5 | 3 | 5 | — | — | 10 | 10 | 10 |
| TMP | 0.15 | 0.15 | 0.15 | 0.15 | 0.15 | — | — | — | — | — |
| PTMG (wt. %) | 7 | 10 | 7 | 5 | 10 | — | — | — | — | — |
| shrinkage (%) | | | | | | | | | | |
| 50° C. | 2.5 | 2.6 | 2.6 | 7.7 | 5.1 | 0 | 0 | 0 | 0 | 0 |
| 60° C. | 33.3 | 35.4 | 28.8 | 43.6 | 43.6 | 0 | 2.9 | 0 | 3.9 | 6.3 |
| 90° C. | 47.4 | 51.9 | 46.8 | 60.3 | 62.3 | 53.4 | 59.5 | 36.1 | 39.5 | 59.5 |
| shrink initiation temp. (°C.) | 49 | 45 | 46 | 40 | 40 | 85 | 60 | 65 | 60 | 55 |
| uneven shrinkage | ⊙ | ⊙ | ⊙ | ⊙ | ⊙ | x | x | Δ | Δ | Δ |

The components listed in the table are as follows. TPA: terephthalic acid IPA: isophthalic acid SA: sebacic acid EG: ethylene glycol BPAE: ethylene oxide adduct of bisphenol A PTMG: polyoxytetramethylene glycol TMP: trimethylolpropane As is apparent from Table 3, the heat shrinkable polyester films of Examples 10 to 14 according to the present invention exhibited a shrinkage initiation temperature of 50° C. or below and a percentage heat shrinkage of 20% or more at 60° C., and substantially no uneven shrinkage was observed. On the other hand, although isophthalic-acid-based polyester films of Comparative Examples 9 and 10 exhibited a large shrinkage at a high temperature, shrinking properties at a low temperature were poor and, at the same time, the occurrence of uneven shrinkage was observed, so that these films were not practical. In polyester films containing an ethylene oxide adduct of bisphenol A of Comparative Examples 11 to 13, although the occurrence of uneven shrinkage was slightly alleviated as compared with Comparative Examples 9 and 10, the alleviation is not yet satisfactory and the shrinking properties at a low temperature as well were poor.

EXAMPLE 15

A reaction vessel was charged with 95 parts by mole of terephthalic acid, 5 parts by mole of isophthalic acid, 150 parts by mole of ethylene glycol, 5 parts by mole of an ethylene oxide adduct of bisphenol A, 0.15 part by mole of trimethylolpropane and 10% by weight, based on the polymer, of polyoxytetramethylene glycol (number average molecular weight: 1000). Trimethyl phosphate was added thereto as a stabilizer in an amount of 50 ppm based on the whole acid component, and antimony trioxide was added thereto as a polymerization catalyst in an amount of 450 ppm based on the whole acid component. Polymerization was conducted by direct polymerization to provide a polyester resin.

The resultant polyester resin was melt-extruded at 270° C. to prepare a raw film. The raw film was uniaxially stretched at 65° C. by 3.8 times the original length in the direction of stretching (direction of TD) to give a heat shrinkable polyester film having a thickness of 40 μm. The results of the measurement of the percentage shrinkage and the results of the evaluation of uneven shrinkage of the resultant film are provided in Table 4.

EXAMPLE 16

A reaction vessel was charged with 87 parts by mole of terephthalic acid, 13 parts by mole of isophthalic acid, 150 parts by mole of ethylene glycol, 3 parts by mole of an ethylene oxide adduct of bisphenol A, 0.15 part by mole of trimethylolpropane and 7% by weight, based on the polymer, of polyoxytetramethylene glycol (number average molecular weight: 1000). Trimethyl phosphate was added thereto as a stabilizer in an amount of 50 ppm based on the whole acid component, and antimony trioxide was added thereto as a polymerization catalyst in an amount of 450 ppm based on the whole acid component. Polymerization was conducted by direct polymerization to provide a polyester resin.

The resultant polyester resin was melt-extruded at 270° C. to prepare a raw film. The raw film was uniaxially stretched at 65° C. by 3.8 times the original length in the direction of stretching (direction of TD) to give a heat shrinkable polyester film having a thickness of 40 μm. The results of the measurement of the percentage shrinkage and the results of the evaluation of uneven shrinkage of the resultant film are provided in Table 4.

COMPARATIVE EXAMPLE 14

A reaction vessel was charged with 80 parts by mole of terephthalic acid, 15 parts by mole of isophthalic acid, 5 parts by mole of sebacic acid and 150 parts by mole of ethylene glycol. Antimony trioxide was added thereto as a polymerization catalyst in an amount of 450 ppm based on the whole acid component. Polymerization was conducted by direct polymerization to provide a polyester resin.

The resultant polyester resin was melt-extruded at 270° C. to prepare a raw film. The raw film was uniaxially stretched at 75° C. by 3.8 times the original length in the direction of stretching (direction of TD) to give a heat shrinkable polyester film having a thickness of 40 μm. The results of the measurement of the percentage shrinkage and shrinkage initiation temperature and the results of the evaluation of uneven shrinkage of the resultant film are provided in Table 4.

COMPARATIVE EXAMPLE 15

A reaction vessel was charged with 95 parts by mole of terephthalic acid, 5 parts by mole of sebacic acid, 150 parts by mole of ethylene glycol and 20 parts by mole of neopentyl glycol. Trimethyl phosphate was added thereto as a stabilizer in an amount of 50 ppm based on the whole acid component, and antimony trioxide and zinc acetate were added thereto as a polymerization catalyst in respective amounts of 450 ppm and 100 ppm each based on the whole acid component. Polymerization was conducted by direct polymerization to provide a polyester resin.

The resultant polyester resin was melt-extruded at 270° C. to prepare a raw film. The raw film was uniaxially stretched at 75° C. by 3.8 times the original length in the direction of stretching (direction of TD) to give a heat shrinkable polyester film having a thickness of 40 μm. The results of the measurement of the percentage shrinkage and shrinkage initiation temperature and the results of the evaluation of uneven shrinkage of the resultant film are provided in Table 4.

TABLE 4

|  | Example No. | | | Comparative Example No. | | | | |
| --- | --- | --- | --- | --- | --- | --- | --- | --- |
|  | 10 | 15 | 16 | 9 | 10 | 11 | 14 | 15 |
| acid component (mol %) | | | | | | | | |
| TPA | 95 | 95 | 87 | 90 | 93 | 100 | 80 | 95 |
| IPA | 5 | 5 | 13 | 10 | 7 | — | 15 | — |
| ADA | — | — | — | — | — | — | 5 | 5 |
| diol component (mol %) | | | | | | | | |
| EG | 97.85 | 94.85 | 96.85 | 100 | 100 | 90 | 100 | 85 |
| NPG | — | — | — | — | — | — | — | 15 |
| BPAE | 2 | 5 | 3 | — | — | 10 | — | — |
| BPSE | — | — | — | — | — | — | — | — |
| TMP | 0.15 | 0.15 | 0.15 | — | — | — | — | — |
| PTMG (wt. %) | 7 | 10 | 7 | — | — | — | — | — |
| shrinkage (%) | | | | | | | | |
| 10 sec | 11.3 | 9.3 | 26.5 | 24.0 | 30.8 | 21.0 | 32.0 | 46.0 |
| 20 sec | 18.7 | 15.3 | 33.1 | 32.0 | 36.8 | 34.0 | 48.0 | 47.0 |
| 30 sec | 22.7 | 22.7 | 43.8 | 33.0 | 38.0 | 34.5 | 51.0 | 47.0 |
| shrinkage rate (%/sec) | | | | | | | | |
| 0–10 sec | 1.13 | 0.93 | 2.65 | 2.40 | 3.08 | 2.10 | 3.20 | 4.60 |
| 10–20 sec | 0.74 | 0.60 | 0.66 | 0.80 | 0.60 | 1.30 | 0.60 | 0.10 |
| 20–30 sec | 0.40 | 0.74 | 1.07 | 0.10 | 0.12 | 0.05 | 0.30 | 0.00 |
| uneven shrinkage | ◉ | ◉ | ◉ | x | x | △ | x | x |

The components listed in the table are as follows. TPA: terephthalic acid IPA: isophthalic acid ADA: adipic acid EG: ethylene glycol BPAE: ethylene oxide adduct of bisphenol A BPSE: ethylene oxide adduct of bisphenol S PTMG: polyoxytetramethylene glycol TMP: trimethylolpropane As is apparent from Table 4, the heat shrinkable polyester films of Examples 10, 15 and 16 exhibited no significant shrinkage, maintained a suitable percentage shrinkage also in the latter stage of the shrinkage, could alleviate uneven shrinkage and were free from uneven shrinkage. On the other hand, heat shrinkable polyester films of Comparative Examples 10, 14 and 15 exhibited a large initial shrinkage, so that uneven shrinkage occurred. Heat shrinkable films of Comparative Examples 9 to 11 and 15 exhibited a low percentage shrinkage in the latter stage of the shrinkage and could not sufficiently alleviate the uneven shrinkage.

EXAMPLE 17

A reaction vessel was charged with 87 parts by mole of terephthalic acid, 13 parts by mole of isophthalic acid, 140 parts by mole of ethylene glycol, 5 parts by mole of an ethylene oxide adduct of bisphenol A, 0.15 part by mole of trimethylolpropane and 7% by weight, based on the polymer, of polyoxytetramethylene glycol (number average molecular weight: 1000). Trimethyl phosphate was added thereto as a stabilizer in an amount of 100 ppm based on the whole acid component, and antimony trioxide was added thereto as a polymerization catalyst in an amount of 450 ppm based on the whole acid component. Polymerization was conducted by direct polymerization to provide a polyester resin.

The resultant polyester resin was melt-extruded at 270° C. to prepare a raw film. The raw film was uniaxially stretched at 60° C. by 3.8 times the original length in the direction of stretching (direction of TD) to give a heat shrinkable polyester film having a thickness of 40 μm. The results of the measurement of the percentage shrinkage and the results of the evaluation of the solvent bondability and uneven shrinkage of the resultant film are provided in Table 5.

EXAMPLE 18

A reaction vessel was charged with 90 parts by mole of terephthalic acid, 10 parts by mole of isophthalic acid, 140 parts by mole of ethylene glycol, 3 parts by mole of an ethylene oxide adduct of bisphenol A, 0.15 part by mole of trimethylolpropane and 7% by weight, based on the polymer, of polyoxytetramethylene glycol (number average molecular weight: 1000). Trimethyl phosphate was added thereto as a stabilizer in an amount of 100 ppm based on the whole acid component, and antimony trioxide was added thereto as a polymerization catalyst in an amount of 450 ppm based on the whole acid component. Polymerization was conducted by direct polymerization to provide a polyester resin.

The resultant polyester resin was melt-extruded at 270° C. to prepare a raw film. The raw film was uniaxially stretched at 60° C. by 3.8 times the original length in the direction of stretching (direction of TD) to give a heat shrinkable polyester film having a thickness of 40 μm. The results of the measurement of the percentage shrinkage and the results of the evaluation of the solvent bondability and uneven shrinkage of the resultant film are provided in Table 5.

EXAMPLE 19

A reaction vessel was charged with 75 parts by mole of terephthalic acid, 25 parts by mole of isophthalic acid, 140 parts by mole of ethylene glycol, 5 parts by mole of an ethylene oxide adduct of bisphenol A, 0.15 part by mole of trimethylolpropane and 7% by weight, based on the polymer, of polyoxytetramethylene glycol (number average molecular weight: 1000). Trimethyl phosphate was added thereto as a stabilizer in an amount of 100 ppm based on the whole acid component, and antimony trioxide was added thereto as a polymerization catalyst in an amount of 450 ppm based on the whole acid component. Polymerization was conducted by direct polymerization to provide a polyester resin.

The resultant polyester resin was melt-extruded at 270° C. to prepare a raw film. The raw film was uniaxially stretched at 60° C. by 3.8 times the original length in the direction of stretching (direction of TD) to give a heat shrinkable polyester film having a thickness of 40 μm. The results of the measurement of the percentage shrinkage and the results of the evaluation of the solvent bondability and uneven shrinkage of the resultant film are provided in Table 5.

TABLE 5

|  | Example No. | | | | | Comp. Ex. No. | |
| --- | --- | --- | --- | --- | --- | --- | --- |
|  | 12 | 16 | 17 | 18 | 19 | 9 | 10 |
| acid component (mol %) | | | | | | | |
| TPA | 95 | 87 | 87 | 90 | 75 | 90 | 93 |
| IPA | 5 | 13 | 13 | 10 | 25 | 10 | 7 |
| diol component (mol %) | | | | | | | |
| EG | 94.35 | 96.85 | 94.85 | 96.85 | 94.85 | 100 | 100 |
| BPAE | 5 | 3 | 5 | 3 | 5 | — | — |
| TMP | 0.15 | 0.15 | 0.15 | 0.15 | 0.15 | — | — |
| PTMG (wt. %) | 7 | 7 | 7 | 7 | 7 | — | — |
| shrinkage | | | | | | | |
| 60° C. (%) | 28.8 | 43.6 | 43.6 | 35.4 | 47.4 | 0 | 2.9 |
| 90° C. (%) | 46.8 | 60.3 | 62.3 | 51.9 | 67.1 | 53.4 | 59.5 |
| uneven shrinkage | ⊚ | ⊚ | ⊚ | ⊚ | ⊚ | x | x |
| solvent bondability | Δ | ○ | ○ | ○ | ⊚ | x | x |

The components listed in the table are as follows. TPA: terephthalic acid IPA: isophthalic acid EG: ethylene glycol BPAE: ethylene oxide adduct of bisphenol A PTMG: polyoxytetramethylene glycol TMP: trimethylolpropane As is apparent from Table 5, the heat shrinkable polyester films of Examples 16 to 18 were free from the occurrence of uneven shrinkage and, at the same time, excellent in the solvent bondability. On the other hand, in the heat shrinkable polyester film of Example 12 wherein the amount of copolymerization of isophthalic acid, although no uneven shrinkage was observed, the solvent bondability was relatively poor. The heat shrinkable polyester films of Comparative Examples 9 and 10 were unsatisfactory both in the occurrence of uneven shrinkage and solvent bondability.

EXAMPLE 20

A reaction vessel was charged with 100 parts by mole of dimethyl terephthalate, 217 parts by mole of ethylene glycol and 3 parts by mole of an ethylene oxide adduct of bisphenol A. Zinc acetate was added thereto as a transesterification catalyst in an amount of 300 ppm based on the whole acid component, and transesterification was conducted while gradually raising the temperature of the system to 240° C. After 91% of the theoretical amount of distilling of methanol was distilled off, trimethyl phosphate was added thereto as a stabilizer in an amount of 250 ppm based on the whole acid component, and germanium dioxide was added thereto as a polymerization catalyst in an amount of 450 ppm based on the whole acid component. The system was evacuated to 5 mmHg or less while gradually raising the temperature of the system to 280° C., and a reaction was allowed to proceed for about 3 hr to give a modified polyester resin. The resin composition and properties of the resultant modified polyester resin are provided in Table 6.

EXAMPLE 21

A reaction vessel was charged with 100 parts by mole of terephthalic acid, 145 parts by mole of ethylene glycol and 5 parts by mole of an ethylene oxide adduct of bisphenol A. Esterification was conducted by gradually raising the temperature of the reaction system to 260° C. while pressurizing the reaction system with nitrogen. After 94% of the theoretical amount of distilling of water was distilled off, trimethyl phosphate was added thereto as a stabilizer in an amount of 100 ppm based on the whole acid component, and antimony trioxide was added thereto as a polymerization catalyst in an amount of 350 ppm based on the whole acid component. The system was evacuated to 5 mmHg or less while gradually raising the temperature of the system to 280° C., and a reaction was allowed to proceed for about 3 hr to give a modified polyester resin. The resin composition and properties of the resultant modified polyester resin are provided in Table 6.

EXAMPLE 22

A reaction vessel was charged with 100 parts by mole of terephthalic acid, 120 parts by mole of ethylene glycol and 10 parts by mole of an ethylene oxide adduct of bisphenol A. Esterification was conducted by gradually raising the temperature of the reaction system to 260° C. while pressurizing the reaction system with nitrogen. After 92% of the theoretical amount of distilling of water was distilled off, trimethyl phosphate was added thereto as a stabilizer in an amount of 50 ppm based on the whole acid moiety, and antimony trioxide was added thereto as a polymerization catalyst in an amount of 350 ppm based on the whole acid component. The system was evacuated to 5 mmHg or less while gradually raising the temperature of the system to 280° C., and a reaction was allowed to proceed for about 3 hr to provide a modified polyester resin. The resin composition and properties of the resultant modified polyester resin are provided in Table 6.

EXAMPLE 23

A reaction vessel was charged with 100 parts by mole of dimethyl terephthalate, 190 parts by mole of ethylene glycol and 30 parts by mole of an ethylene oxide adduct of bisphenol A. Zinc acetate was added thereto as a transesterification catalyst in an amount of 300 ppm based on the whole acid component, and transesterification was conducted while gradually raising the temperature of the system to 240° C. After 94% of the theoretical amount of distilling of methanol was distilled off, trimethyl phosphate was added thereto as a stabilizer in an amount of 250 ppm based on the whole acid component, and antimony trioxide was added thereto as a polymerization catalyst in an amount of 450 ppm based on the whole acid component. The system was evacuated to 5 mmHg or less while gradually raising the temperature of the system to 280° C., and a reaction was allowed to proceed for about 3 hr to give a modified polyester resin. The resin composition and properties of the resultant modified polyester resin are provided in Table 6.

EXAMPLE 24

A reaction vessel was charged with 100 parts by mole of terephthalic acid, 100 parts by mole of ethylene glycol and 50 parts by mole of an ethylene oxide adduct of bisphenol A. Esterification was conducted by gradually raising the temperature of the reaction system to 260° C. while pressurizing the reaction system with nitrogen. After 92% of the theoretical amount of distilling of water was distilled off, trimethyl phosphate was added thereto as a stabilizer in an amount of 50 ppm based on the whole acid component, and antimony trioxide was added thereto as a polymerization catalyst in an amount of 350 ppm based on the whole acid component. The system was evacuated to 5 mmHg or less while gradually raising the temperature of the system to 280° C., and a reaction was allowed to proceed for about 3 hr to provide a modified polyester resin. The resin composition and properties of the resultant modified polyester resin are provided in Table 6.

EXAMPLE 25

A reaction vessel was charged with 100 parts by mole of methyl naphthalenedicarboxylate, 170 parts by mole of ethylene glycol and 65 parts by mole of an ethylene oxide adduct of bisphenol A. Zinc acetate was added thereto as a transesterification catalyst in an amount of 400 ppm based on the whole acid moiety, and transesterification was conducted while gradually raising the temperature of the system to 240° C. After 94% of the theoretical amount of distilling of methanol was distilled off, trimethyl phosphate was added thereto as a stabilizer in an amount of 300 ppm based on the whole acid component, and antimony trioxide was added thereto as a polymerization catalyst in an amount of 500 ppm based on the whole acid component. The system was evacuated to 5 mmHg or less while gradually raising the temperature of the system to 280° C., and a reaction was allowed to proceed for about 4 hr to give a modified polyester resin. The resin composition and properties of the resultant modified polyester resin are provided in Table 6.

EXAMPLE 26

A reaction vessel was charged with 100 parts by mole of dimethyl terephthalate, 130 parts by mole of ethylene glycol and 85 parts by mole of an ethylene oxide adduct of bisphenol A. Zinc acetate was added thereto as a transesterification catalyst in an amount of 500 ppm based on the whole acid component, and transesterification was conducted while gradually raising the temperature of the system to 240° C. After 94% of the theoretical amount of distilling of methanol was distilled off, trimethyl phosphate was added thereto as a stabilizer in an amount of 400 ppm based on the whole acid component, and antimony trioxide was added thereto as a polymerization catalyst in an amount of 600 ppm based on the whole acid component. The system was evacuated to 5 mmHg or less while gradually raising the temperature of the system to 280° C., and a reaction was allowed to proceed for about 4 hr to give a modified polyester resin. The resin composition and properties of the resultant modified polyester resin are provided in Table 6.

EXAMPLE 27

A reaction vessel was charged with 100 parts by mole of dimethyl terephthalate, 120 parts by mole of ethylene glycol and 100 parts by mole of an ethylene oxide adduct of bisphenol A. Zinc acetate was added thereto as a transesterification catalyst in an amount of 500 ppm based on the whole acid component, and transesterification was conducted while gradually raising the temperature of the system to 240° C. After 94% of the theoretical amount of distilling of methanol was distilled off, trimethyl phosphate was added thereto as a stabilizer in an amount of 400 ppm based on the whole acid component, and antimony trioxide was added thereto as a polymerization catalyst in an amount of 600 ppm based on the whole acid component. The system was evacuated to 5 mmHg or less while gradually raising the temperature of the system to 280° C., and a reaction was allowed to proceed for about 4 hr to provide a modified polyester resin. The resin composition and properties of the resultant modified polyester resin are provided in Table 6.

COMPARATIVE EXAMPLE 16

A reaction vessel was charged with 100 parts by mole of terephthalic acid and 150 parts by mole of ethylene glycol. Esterification was conducted by gradually raising the temperature of the reaction system to 260° C. while pressurizing the reaction system with nitrogen. After 92% of the theoretical amount of distilling of water was distilled off, trimethyl phosphate was added thereto as a stabilizer in an amount of 50 ppm based on the whole acid component, and antimony trioxide was added thereto as a polymerization catalyst in an amount of 350 ppm based on the whole acid component. The system was evacuated to 5 mmHg or less while gradually raising the temperature of the system to 280° C., and a reaction was allowed to proceed for about 3 hr to provide a modified polyester resin. The resin composition and properties of the resultant modified polyester resin are provided in Table 6.

COMPARATIVE EXAMPLE 17

A reaction vessel was charged with 70 parts by mole of dimethyl terephthalate, 30 parts by mole of dimethyl isophthalate and 220 parts by mole of ethylene glycol. Zinc acetate was added thereto as a transesterification catalyst in an amount of 300 ppm based on the whole acid component, and transesterification was conducted while gradually raising the temperature of the system to 240° C. After 94% of the theoretical amount of distilling of methanol was distilled off, trimethyl phosphate was added thereto as a stabilizer in an amount of 250 ppm based on the whole acid component, and antimony trioxide was added thereto as a polymerization catalyst in an amount of 450 ppm based on the whole acid component. The system was evacuated to 5 mmHg or less while gradually raising the temperature of the system to 280° C., and a reaction was allowed to proceed for about 3 hr to provide a modified polyester resin. The resin composition and properties of the resultant modified polyester resin are provided in Table 6.

COMPARATIVE EXAMPLE 18

A reaction vessel was charged with 70 parts by mole of dimethyl terephthalate, 219 parts by mole of ethylene glycol and 1 part by mole of an ethylene oxide adduct of bisphenol A. Zinc acetate was added thereto as a transesterification catalyst in an amount of 300 ppm based on the whole acid component, and transesterification was conducted while gradually raising the temperature of the system to 240° C. After 95% of the theoretical amount of distilling of methanol was distilled off, trimethyl phosphate was added thereto as a stabilizer in an amount of 250 ppm based on the whole acid component, and antimony trioxide was added thereto as a polymerization catalyst in an amount of 450 ppm based on the whole acid component. The system was evacuated to 5 mmHg or less while gradually raising the temperature of the system to 280° C., and a reaction was allowed to proceed for about 3 hr to give a modified polyester resin. The resin composition and properties of the resultant modified polyester resin are provided in Table 6.

COMPARATIVE EXAMPLE 19

A reaction vessel was charged with 100 parts by mole of dimethyl terephthalate, 100 parts by mole of ethylene glycol and 120 parts by mole of an ethylene oxide adduct of bisphenol A. Zinc acetate was added thereto as a transesterification catalyst in an amount of 600 ppm based on the whole acid component, and transesterification was conducted while gradually raising the temperature of the system to 240° C. After 95% of the theoretical amount of distilling of methanol was distilled off, trimethyl phosphate was added thereto as a stabilizer in an amount of 450 ppm based on the whole acid component, and germanium dioxide was added thereto as a polymerization catalyst in an amount of 500 ppm based on the whole acid component. The system was evacuated to 5 mmHg or less while gradually raising the temperature of the system to 280° C., and a reaction was allowed to proceed for about 3 hr to give a modified bisphenol A. Esterification was conducted by gradually raising the temperature of the reaction system to 260° C. while pressurizing the reaction system with nitrogen. After 92% of the theoretical amount of distilling of water was distilled off, trimethyl phosphate was added thereto as a stabilizer in an amount of 50 ppm based on the whole acid component, and antimony trioxide was added thereto as a polymerization catalyst in an amount of 350 ppm based on the whole acid component. The system was evacuated to 5 mmHg or less while gradually raising the temperature of the system to 280° C., and a reaction was allowed to proceed for about 3 hr to give a modified polyester resin. The resin composition and properties of the resultant modified polyester resin are provided in Table 6.

TABLE 6

| | Example No. | | | | | | | | Comparative Example No. | | | | | |
|---|---|---|---|---|---|---|---|---|---|---|---|---|---|---|
| | 20 | 21 | 22 | 23 | 24 | 25 | 26 | 27 | 16 | 17 | 18 | 19 | 20 | 21 |
| acid component (mol %) | | | | | | | | | | | | | | |
| TPA | 100 | 100 | 100 | 100 | 100 | — | 100 | 100 | 100 | 70 | 100 | 100 | 100 | 100 |
| IPA | — | — | — | — | — | — | — | — | — | 30 | — | — | — | — |
| NDCA | — | — | — | — | — | 100 | — | 100 | — | — | — | — | — | — |
| diol component (mol %) | | | | | | | | | | | | | | |
| EG | 97 | 95 | 90 | 70 | 55 | 40 | 20 | 3 | 100 | 100 | 99 | 1 | 90 | 70 |
| BPAE | 3 | 5 | 10 | 30 | 45 | 60 | 80 | 97 | — | — | 1 | 99 | 10 | — |
| CHDM | — | — | — | — | — | — | — | — | — | — | — | — | — | 30 |
| glass transiation temp. (°C.) | 75 | 74 | 73 | 73 | 72 | 72 | 72 | 70 | 75 | 64 | 75 | 70 | 72 | 78 |
| melting point (°C.) | 249 | 245 | 233 | — | — | — | — | — | 259 | — | 255 | — | 231 | — |
| Tc+ (°C.) | 132 | 135 | 130 | — | — | — | — | — | 130 | — | 132 | — | 131 | — |
| Tc− (°C.) | 180 | 170 | 168 | — | — | — | — | — | 210 | — | 205 | — | 163 | — |
| intrinsic viscosity (dl/g) | 0.82 | 0.80 | 0.77 | 0.80 | 0.72 | 0.62 | 0.70 | 0.69 | 0.85 | 0.81 | 0.81 | 0.71 | 0.73 | 0.85 |
| DEG (wt. %) | 1.00 | 0.95 | 0.69 | 0.35 | 0.21 | 0.19 | 0.32 | 0.25 | 1.85 | 1.43 | 1.53 | 0.43 | 3.25 | 1.16 |
| impact strength 1 (kg · cm/cm) | 3.5 | 3.6 | 3.4 | 3.6 | 3.9 | 3.9 | 3.9 | 3.0 | 3.5 | 1.7 | 3.3 | 2.4 | 3.2 | 7.3 |
| impact strength 2 (kg · cm/cm) | N.B | N.B | N.B. | N.B. | N.B. | N.B. | N.B. | N.B. | N.B. | 29.8 | N.B. | N.B | N.B. | N.B. |
| moldability | ○ | ⊚ | ⊚ | ⊚ | ⊚ | ⊚ | ⊚ | ⊚ | x | x | x | x | ○ | ○ |
| oxidation stability | A | A | A | A | A | A | A | A | B | B | B | B | C | C | polyester resin. The resin composition and properties of the resultant modified polyester resin are provided in Table 6.

COMPARATIVE EXAMPLE 20

A reaction vessel was charged with 100 parts by mole of dimethyl terephthalate, 185 parts by mole of ethylene glycol and 35 parts by mole of cyclohexanedimethanol. Manganese acetate, cobalt acetate and titanium tetrabutoxide were added thereto as a transesterification catalyst in respective amounts of 200 ppm, 330 ppm and 400 ppm each based on the whole acid component, and transesterification was conducted while gradually raising the temperature of the system to 240° C. After 94% of the theoretical amount of distilling of methanol was distilled off, trimethyl phosphate was added thereto as a stabilizer in an amount of 400 ppm based on the whole acid component. The system was evacuated to 5 mmHg or less while gradually raising the temperature of the system to 280° C., and a reaction was allowed to proceed for about 4 hr to provide a modified polyester resin. The resin composition and properties of the resultant modified polyester resin are provided in Table 6.

COMPARATIVE EXAMPLE 21

A reaction vessel was charged with 100 parts by mole of terephthalic acid, 250 parts by mole of ethylene glycol and 10 parts by mole of an ethylene oxide adduct of The components listed in the table are as follows. TPA: terephthalic acid IPA: isophthalic acid NDCA: naphthalenedicarboxylic acid EG: ethylene glycol BPAE: ethylene oxide adduct of bisphenol A CHDM: cyclohexanedimethanol DEG: diethylene glycol

We claim:

1. A heat shrinkable polyester film comprising a dicarboxylic acid component comprising an aromatic dicarboxylic acid or its ester forming derivative and a diol component comprising ethylene glycol and an ethylene oxide adduct of a bisphenol compound or its derivative, the content of the ethylene oxide adduct of a bisphenol compound or its derivative being 0.1 to 50% by mole based on the whole diol component, said film further comprising 0.1 to 20% by weight of a compound selected from the group consisting of polyoxytetramethylene glycol, polyethylene glycol and mixtures thereof, and wherein the polyoxytetramethylene glycol has a number average molecular weight of 300 to 4,000, and the polyethylene glycol has a number average molecular weight of 300 to 20,000.

2. A heat shrinkable polyester film according to claim 1, wherein the content of the polyoxytetramethylene glycol, polyethylene glycol, and mixtures thereof is 0.3 to 15% by weight.

3. A heat shrinkable polyester film according to claim 1, which further comprises 0.01 to 1% by weight of a compound selected from the group consisting of a tricarboxylic acid or higher polycarboxylic acid, a trihydric or higher polyhydric alcohol, and mixtures thereof.

4. A heat shrinkable polyester film according to claim 1, which further comprises 0.05 to 0.7% by weight of a compound selected from the group consisting of a tricarboxylic or higher polycarboxylic acid a trihydric or higher polyhydric alcohol, and mixtures thereof.

5. A heat shrinkable polyester film according to claim 4, wherein the polycarboxylic is selected from the group consisting of trimellitic acid, pyromellitic acid and their anhydrides.

6. A heat shrinkable polyester film according to claim 4, wherein the polyhydric alcohol is selected from the group consisting of trimethylolpropane, glycerin and pentaerythritol.

7. A heat shrinkable polyester film according to claim 1, wherein the ethylene oxide adduct of a bisphenol compound is an ethylene oxide adduct of bisphenol A.

8. A heat shrinkable polyester film according to claim 1, wherein the ethylene oxide adduct of a bisphenol compound is an ethylene oxide adduct of bisphenol S.

9. A heat shrinkable polyester film according to claim 1, wherein the dicarboxylic acid component comprises terephthalic acid and isophthalic acid or their ester forming derivative and the isophthalic acid or its ester forming derivative is contained in an amount of from 7 to 30% by mole based on the whole dicarboxylic acid component.

10. A heat shrinkable polyester film according to claim 9, wherein the isophthalic acid or its ester forming derivative is contained in an amount of 10 to 30% by mole based on the whole dicarboxylic acid component.

11. A heat shrinkable polyester film according to claim 10, wherein the isophthalic acid or its ester forming derivative is contained in an amount of 12 to 30% by mole based on the whole dicarboxylic acid component.

12. A heat shrinkable polyester film comprising a dicarboxylic acid component comprising an aromatic dicarboxylic acid or its ester forming derivative and a diol component comprising ethylene glycol and an ethylene oxide adduct of a bisphenol compound or its derivative, the content of the ethylene oxide adduct of a bisphenol compound or its derivative being 0.1 to 50% by mol based on the whole diol component, said film further comprising 0.01 to 1% by weight of a compound selected from the group consisting of a tricarboxylic or higher polycarboxylic acid, a trihydric or higher polyhydric alcohol, and mixtures thereof.

13. A heat shrinkable polyester film according to claim 12, wherein the content of the tricarboxylic or higher polycarboxylic acid, trihydric or higher polyhydric alcohol, and mixtures thereof in the resin is 0.05 to 0.7% by weight.

14. A heat shrinkable polyester film according to claim 12, wherein the polycarboxylic acid is selected from the group consisting of trimellitic acid, pyromellitic acid and their anhydrides.

15. A heat shrinkable polyester film according to claim 12, wherein the polyhydric alcohol is selected from the group consisting of trimethylolpropane, glycerin and pentaerythritol.

16. A heat shrinkable polyester film according to claim 12, wherein the content of the ethylene oxide adduct of a bisphenol compound or its derivative is 0.5 to 30% by mole based on the whole acid component.

17. A heat shrinkable polyester film according to claim 12, wherein the ethylene oxide adduct of a bisphenol compound is an ethylene oxide adduct of bisphenol A.

18. A heat shrinkable polyester film according to claim 12, wherein the ethylene oxide adduct of a bisphenol compound is an ethylene oxide adduct of bisphenol S.

19. A heat shrinkable polyester film according to claim 12, wherein the dicarboxylic acid component comprises terephthalic acid and isophthalic acid or their ester forming derivative and the isophthalic acid or its ester forming derivative is contained in an amount of from 7 to 30% by mole based on the whole dicarboxylic acid component.

20. A heat shrinkable polyester film according to claim 12, wherein the isophthalic acid or its ester forming derivative is contained in an amount of 10 to 30% by mole based on the whole dicarboxylic acid component.

21. A heat shrinkable polyester film according to claim 12, wherein the isophthalic acid or its ester forming derivative is contained in an amount of 12 to 30% by mole based on the whole dicarboxylic acid component.

22. A polyester bottle comprising an acid component comprising terephthalic acid or its ester forming derivative and a diol component comprising ethylene glycol and an ethylene oxide adduct of bisphenol A, the content of the ethylene oxide adduct of bisphenol A being 3 to 98% by mole based on the whole diol component, said polyester bottle having an intrinsic viscosity of 0.5 to 1.4 dl/g and a diethylene glycol content of 1.2% by weight or less.

23. A polyester bottle according to claim 22, wherein the content of the ethylene oxide adduct of bisphenol A is 5 to 80% by mole based on the whole diol component.

24. A polyester bottle according to claim 22, wherein the content of the ethylene oxide adduct of bisphenol A is 10 to 60% by mole based on the whole diol component.

25. A polyester bottle according to claim 22, wherein the content of the ethylene oxide adduct of bisphenol A is 10 to 50% by mole based on the whole diol component.

26. A polyester bottle according to claim 22, wherein the intrinsic viscosity is 0.6 to 1.2 dl/g.

27. A polyester bottle according to claim 22, wherein the diethylene glycol unit content is 0.9% by weight or less.

28. A polyester bottle according to claim 22, wherein the diethylene glycol unit content is 0.8% by weight or less.

29. A heat shrinkable polyester film according to claim 1 or 12, which exhibits a percentage shrinkage of 20% or more at 60° C. in a unidirection when the film is heated in a hot water bath for 60 sec, and a shrinkage initiation temperature of 50° C. or above.

30. A heat shrinkable polyester film according to claim 1 or 12, which exhibits a percentage shrinkage of 25% or more at 60° C. in a unidirection when the film is heated in a hot water bath for 60 sec.

31. A heat shrinkable polyester film according to claim 1 or 12, which exhibits a percentage shrinkage of 30% or more at 60° C. in a unidirection when the film is heated in a hot water bath for 60 sec.

32. A heat shrinkable polyester film according to claim 1 or 12, which exhibits a percentage shrinkage of 1% or more at 50° C. in a unidirection when the film is heated in a hot water bath for 60 sec.

33. A heat shrinkable polyester film according to claim 1 or 12, which has a percentage shrinkage of 2% or more at 50° C. in a unidirection when the film is heated in a hot water bath for 60 sec.

34. A heat shrinkable polyester film according to claim 1 or 12, which exhibits an average shrinkage rate in the range of 0.3 to 3%/sec in a period between 0 sec and 10 sec, between 10 sec and 20 sec and between 20 sec and 30 sec after the initiation of immersion of said film in a hot water bath.

* * * * *